United States Patent
Zhong

(10) Patent No.: US 9,459,487 B2
(45) Date of Patent: Oct. 4, 2016

(54) COLOR LIQUID CRYSTAL DISPLAY PANEL COMPRISING DICHROIC DYES MIXED IN A LIQUID CRYSTAL MATERIAL AND MANUFACTURING METHOD THEREOF

(71) Applicant: Shenzhen China Star Optoelectronics Technology Co., Ltd., Shenzhen, Guangdong (CN)

(72) Inventor: Xinhui Zhong, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 101 days.

(21) Appl. No.: 14/241,049

(22) PCT Filed: Dec. 2, 2013

(86) PCT No.: PCT/CN2013/088355
§ 371 (c)(1),
(2) Date: Feb. 25, 2014

(87) PCT Pub. No.: WO2015/078024
PCT Pub. Date: Jun. 4, 2015

(65) Prior Publication Data
US 2015/0146145 A1    May 28, 2015

(30) Foreign Application Priority Data
Nov. 28, 2013    (CN) .......................... 2013 1 0625506

(51) Int. Cl.
*G02F 1/1335* (2006.01)
*G02F 1/137* (2006.01)
(Continued)

(52) U.S. Cl.
CPC ..... *G02F 1/133514* (2013.01); *G02F 1/13737* (2013.01); *G02F 1/1339* (2013.01); *G02F 1/1362* (2013.01); *G02F 2001/13706* (2013.01)

(58) Field of Classification Search
CPC ............ G02F 1/133514; G02F 2001/133357; G02F 1/1362
USPC ........................................................ 349/106
See application file for complete search history.

(56) References Cited

U.S. PATENT DOCUMENTS 5,936,693 A * 8/1999 Yoshida ............ G02F 1/134336
349/106
2001/0006227 A1    7/2001 Kobayashi
(Continued)

FOREIGN PATENT DOCUMENTS

| CN | 101393361 A | 3/2009 |
|----|-------------|--------|
| CN | 101697050 A | 4/2010 |
| CN | 103235445 A | 8/2013 |

*Primary Examiner* — Paul Lee
(74) *Attorney, Agent, or Firm* — Andrew C. Cheng

(57) ABSTRACT

The present invention provides a color liquid crystal display panel and a manufacturing method thereof. The color liquid crystal display panel includes: a first substrate (2), a second substrate (3), and dye-doped liquid crystal layers (4) hermetically sealed between the first substrate (2) and the second substrate (3). The dye-doped liquid crystal layers (4) each include a liquid crystal material, a chiral dopant, and at least one dichroic dye. Each of the dichroic dyes absorbs a light of a predetermined wavelength range. The color liquid crystal display panel and the manufacturing method thereof according to the present invention add at least one dichroic dye in a liquid crystal material so as to use selective absorbability of the dichroic dye with respect to visible lights to adjust light intensity and also to achieve color displaying through collaboration of a color filter and the dichroic dye, whereby there is no need to include a conventionally used polarizer so as to reduce the manufacturing cost of the color liquid crystal display panel, also reduce the requirement for backlighting brightness, enhance light transmittal and optical efficiency, and thus lower down energy consumption of the operation of a color liquid crystal display.

14 Claims, 6 Drawing Sheets

(51) Int. Cl.
  *G02F 1/1339*  (2006.01)
  *G02F 1/1362*  (2006.01)

(56) References Cited

U.S. PATENT DOCUMENTS

| | | | | |
|---|---|---|---|---|
| 2001/0040542 A1* | 11/2001 | Harada | ............... | G02F 1/13473 345/87 |
| 2004/0201793 A1* | 10/2004 | Anandan et al. | ............... | 349/61 |
| 2010/0227084 A1 | 9/2010 | Kato et al. | | |
| 2011/0234930 A1* | 9/2011 | Nishida | ................ | G09G 3/3655 349/33 |
| 2012/0133863 A1* | 5/2012 | Jin | ........................ | G02F 1/1334 349/86 |
| 2012/0327355 A1* | 12/2012 | Cheng | ................... | G02F 1/1341 349/153 |
| 2013/0128213 A1* | 5/2013 | Ito | ........................ | G02F 1/1339 349/153 |

* cited by examiner

COLOR LIQUID CRYSTAL DISPLAY PANEL COMPRISING DICHROIC DYES MIXED IN A LIQUID CRYSTAL MATERIAL AND MANUFACTURING METHOD THEREOF

BACKGROUND OF THE INVENTION

1. Field of the Invention

The present invention relates to the field of liquid crystal display technology, and in particular to a color liquid crystal display panel and a manufacturing method thereof.

2. The Related Arts

The continuous progress of the modern industry makes the issues of energy shortage and environmental pollution more prominent and these issues of environment and energy are attracting increasing attention of people. It is now a problem to be faced by all industries and businesses to develop and make products that is more energy saving and more environmentally conservative. The liquid crystal displaying industry is similarly facing the same challenge. Thus, it has been a problem to be settled to develop liquid crystal displays that are more energy saving and have increased efficiency.

Liquid crystal displays (LCDs) have a variety of advantages, such as thin device body, low power consumption, and being free of radiation, and are thus widely used. However, it is publically known that the liquid crystal displays are a passive optical device and the liquid crystal material itself does not emit light. Thus, most of the liquid crystal displays that are currently available in the market are backlighting liquid crystal displays, which comprise a liquid crystal display panel and a backlight module.

The liquid crystal display panel is generally used as an optic switch element and a light intensity modulation element in order to achieve the function of displaying an image and of which the operation principle is that, with liquid crystal molecules interposed between two parallel glass substrates, application of electricity to the two glass substrates is selectively carried out to control the liquid crystal molecules to change direction in order to refract out light emitting from the backlight module for generating images. A liquid crystal display panel is usually composed of a color filter (CF) substrate, a thin-film transistor (TFT) substrate, liquid crystal (LC) interposed between the CF substrate and the TFT substrate, and a sealant and the manufacturing process generally comprises: a front stage of array process (including thin film, yellow light, etching, and film stripping), an intermediate stage of cell process (including laminating the TFT substrate and the CF substrate), and a rear stage of module assembling process (including mounting of drive ICs and printed circuit board). The front stage of array process generally forms the TFT substrate in order to control the movement of the liquid crystal molecules. The intermediate stage of cell process generally introduces the liquid crystal between the TFT substrate and the CF substrate. The rear stage of assembling process generally integrates the drive ICs and combining the printed circuit board to achieve driving of the liquid crystal molecules to rotate for displaying images.

Referring to FIG. 1, which is a schematic view showing the structure of a conventional color liquid crystal display panel, the conventional color liquid crystal display panel generally comprises, in a layer stacked arrangement from top to bottom, an upper polarizer 100, a color filter substrate 110, a liquid crystal layer 120, a thin-film transistor substrate 130, and a lower polarizer 140, the layers being stacked, sequentially from top to bottom, to constitute a display panel. To achieve full color displaying, a common practice is to form a color filter on a glass plate of a liquid crystal display panel (which is often a glass plate that is set opposite to the glass plate of the thin-film transistor substrate) to form a color filter substrate so as to make use of the principle of spatial color mixture to fulfill full color displaying.

However, some components of such a structure of color liquid crystal display panel have extremely strong effects of absorption and filtering of light. For example, the upper and lower polarizers often filter off and absorb more than 55% light intensity, so that light utilization of the conventional liquid crystal display panel is extremely low, which is around 5-8%. Most of the energy of the backlighting is wasted. With the trend of development of liquid crystal displays toward high resolution, light utilization would get even lower and the percentage of energy wasted would get even higher.

SUMMARY OF THE INVENTION

An object of the present invention is to provide a color liquid crystal display panel, which has a simple structure, requires no inclusion of a polarizer, has a simple manufacturing process, has low energy consumption, reduces the manufacture cost of the color liquid crystal display panel, reduces the requirement of backlighting brightness, and enhances light transmittal and optical efficiency.

Another object of the present invention is to provide a manufacturing method of a color liquid crystal display panel, which simplifies the manufacturing process of a liquid crystal display panel and lowers down the manufacturing cost of the liquid crystal display panel and the liquid crystal display panel manufactured therewith has a reduced requirement for backlighting brightness thereby enhancing transmittal and optical efficiency and also reducing energy consumption of operation thereof.

To achieve the above objects, the present invention provides a color liquid crystal display panel, which comprises: a first substrate, a second substrate laminated on the first substrate, and dye-doped liquid crystal layers hermetically sealed between the first substrate and the second substrate. The dye-doped liquid crystal layers each comprise a liquid crystal material, a chiral dopant, and at least one dichroic dye. Each of the dichroic dyes absorbs a light of a predetermined wavelength range. The first substrate comprises a first transparent substrate, a plurality of gate lines formed on the first transparent substrate, and a plurality of data lines formed on the first transparent substrate. The second substrate comprises a second transparent substrate, a black matrix formed on the second transparent substrate, and a color filter arranged on the second transparent substrate at a location corresponding to the black matrix. The black matrix and the gate lines and the data lines collectively divide the color liquid crystal display panel into a plurality of pixels.

The liquid crystal material is a positive nematic liquid crystal material. The color filter comprises a red filter, a green filter, and a blue filter juxtaposing each other. The plurality of pixels comprises: a plurality of red pixels, a plurality of green pixels, and a plurality of blue pixels.

The color liquid crystal display panel further comprises a sealant frame arranged on the second substrate and set on an edge of the second substrate and electrically conductive resin arranged on the second substrate and set outside the sealant frame.

The first substrate is a thin-film transistor array substrate and the first substrate further comprises an array of thin-film transistors formed on the first transparent substrate, an insulation layer formed on the array of thin-film transistors, the data lines, and the first transparent substrate, pixel electrodes formed on the insulation layer, a first planarization layer formed on the pixel electrodes and the insulation layer, and a first alignment layer formed on the first planarization layer. The second substrate is a package substrate and the second substrate further comprises a second planarization layer formed on the black matrix and the color filter, a common electrode formed on the second planarization layer, a second alignment layer formed on the common electrode, and a spacer layer formed on the second alignment layer.

The first transparent substrate and the second transparent substrate are both glass substrates. The pixel electrodes and the common electrodes are both made of indium tin oxides. The first alignment layer and the second alignment layer are both horizontal alignment layers. The first alignment layer and the second alignment layer realize alignment by means of rubbing alignment or photo alignment. The first alignment layer has an alignment direction that defines an included angle with respect to an alignment direction of the second alignment layer and the included angle is greater than 0° and less than 180°.

The included angle defined between the alignment direction of the first alignment layer and the alignment direction of the second alignment layer is 90°.

The present invention also provides a color liquid crystal display panel, which comprises: a first substrate, a second substrate laminated on the first substrate, and dye-doped liquid crystal layers hermetically sealed between the first substrate and the second substrate, the dye-doped liquid crystal layers each comprising a liquid crystal material, a chiral dopant, and at least one dichroic dye, each of the dichroic dyes absorbing a light of a predetermined wavelength range, the first substrate comprising a first transparent substrate, a plurality of gate lines formed on the first transparent substrate, and a plurality of data lines formed on the first transparent substrate, the second substrate comprising a second transparent substrate, a black matrix formed on the second transparent substrate, and a color filter arranged on the second transparent substrate at a location corresponding to the black matrix, the black matrix and the gate lines and the data lines collectively dividing the color liquid crystal display panel into a plurality of pixels;

wherein the liquid crystal material is a positive nematic liquid crystal material; the color filter comprises a red filter, a green filter, and a blue filter juxtaposing each other; and the plurality of pixels comprises: a plurality of red pixels, a plurality of green pixels, and a plurality of blue pixels;

the color liquid crystal display panel further comprising a sealant frame arranged on the second substrate and set on an edge of the second substrate and electrically conductive resin arranged on the second substrate and set outside the sealant frame.

The first substrate is a thin-film transistor array substrate and the first substrate further comprises an array of thin-film transistors formed on the first transparent substrate, an insulation layer formed on the array of thin-film transistors, the data lines, and the first transparent substrate, pixel electrodes formed on the insulation layer, a first planarization layer formed on the pixel electrodes and the insulation layer, and a first alignment layer formed on the first planarization layer. The second substrate is a package substrate and the second substrate further comprises a second planarization layer formed on the black matrix and the color filter, a common electrode formed on the second planarization layer, a second alignment layer formed on the common electrode, and a spacer layer formed on the second alignment layer.

The first transparent substrate and the second transparent substrate are both glass substrates. The pixel electrodes and the common electrodes are both made of indium tin oxides. The first alignment layer and the second alignment layer are both horizontal alignment layers. The first alignment layer and the second alignment layer realize alignment by means of rubbing alignment or photo alignment. The first alignment layer has an alignment direction that defines an included angle with respect to an alignment direction of the second alignment layer and the included angle is greater than 0° and less than 180°.

The included angle defined between the alignment direction of the first alignment layer and the alignment direction of the second alignment layer is 90°.

The present invention further provides a manufacturing method of a color liquid crystal display panel, which comprises:

(1) providing the first substrate, wherein the first substrate is a thin-film transistor array substrate;

(2) dropping a mixture comprising a liquid crystal material, a chiral dopant, and at least one dichroic dye on the first substrate to form dye-doped liquid crystal layers, wherein each of the dichroic dyes absorbs a light of a predetermined wavelength range;

(3) providing a second substrate, wherein the second substrate is a package substrate and the second substrate comprises a second transparent substrate, a black matrix formed on the second transparent substrate, and a color filter arranged on the second transparent substrate and corresponding to the black matrix;

(4) coating a sealant on a surface of the second substrate to form a sealant frame;

(5) coating an electrically conductive resin on the second substrate at a location around and outside the sealant frame; and (6) laminating the second substrate and the first substrate together in a vacuum environment and subjecting the sealant frame to curing so as to hermetically seal the dye-doped liquid crystal layers between the first substrate and the second substrate.

The liquid crystal material is a positive nematic liquid crystal material. The color filter comprises a red filter, a green filter, and a blue filter juxtaposing each other. In step (6), the sealant frame is subjected to UV curing or thermal curing.

The first substrate comprises a first transparent substrate, a plurality of gate lines formed on the first transparent substrate, a plurality of data lines formed on the first transparent substrate, an array of thin-film transistors formed on the first transparent substrate, an insulation layer formed on the array of thin-film transistors, the data lines, and the first transparent substrate, pixel electrodes formed on the insulation layer, a first planarization layer formed on the pixel electrodes and the insulation layer, and a first alignment layer formed on the first planarization layer. The second substrate further comprises a second planarization layer formed on the black matrix and the color filter, a common electrode formed on the second planarization layer, a second alignment layer formed on the common electrode, and a spacer layer formed on the second alignment layer.

The black matrix and the gate lines and the data lines collectively divide the color liquid crystal display panel into a plurality of pixels and the plurality of pixels comprises: a plurality of red pixels, a plurality of green pixels, and a plurality of blue pixels.

The first transparent substrate and the second transparent substrate are both glass substrates. The pixel electrodes and the common electrodes are both made of indium tin oxides. The first alignment layer and the second alignment layer are both horizontal alignment layers. The first alignment layer and the second alignment layer realize alignment by means of rubbing alignment or photo alignment. The first alignment layer has an alignment direction that defines an included angle with respect to an alignment direction of the second alignment layer and the included angle is greater than 0° and less than 180°.

The included angle defined between the alignment direction of the first alignment layer and the alignment direction of the second alignment layer is 90°.

The efficacy of the present invention is that the present invention provides a color liquid crystal display panel and a manufacturing method thereof, wherein at least one dichroic dye is added in a liquid crystal material so as to use selective absorbability of the dichroic dye with respect to visible lights to adjust light intensity and also to achieve color displaying through collaboration of a color filter and the dichroic dye, whereby there is no need to include a conventionally used polarizer so as to reduce the manufacturing cost of the color liquid crystal display panel, also reduce the requirement for backlighting brightness, enhance light transmittal and optical efficiency, and thus lower down energy consumption of the operation of a color liquid crystal display.

BRIEF DESCRIPTION OF THE DRAWINGS

The technical solution, as well as other beneficial advantages, of the present invention will be apparent from the following detailed description of embodiments of the present invention, with reference to the attached drawing. In the drawing.

DETAILED DESCRIPTION OF THE PREFERRED EMBODIMENTS

Figure 1:
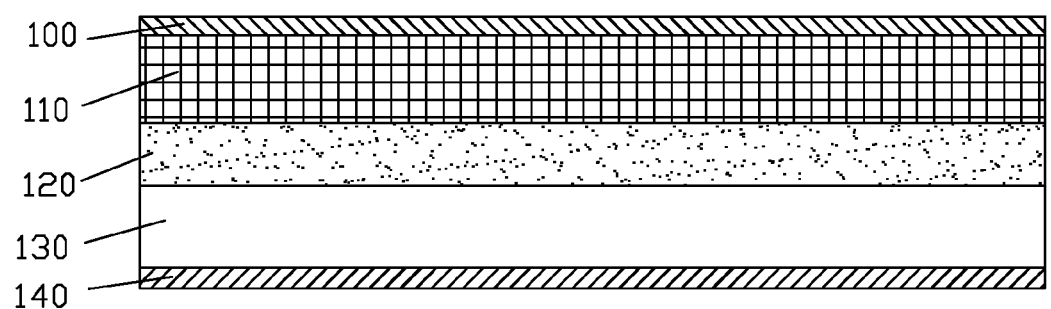
FIG. 1 is a schematic view showing the structure of a conventional color liquid crystal display panel.
Figure 2:
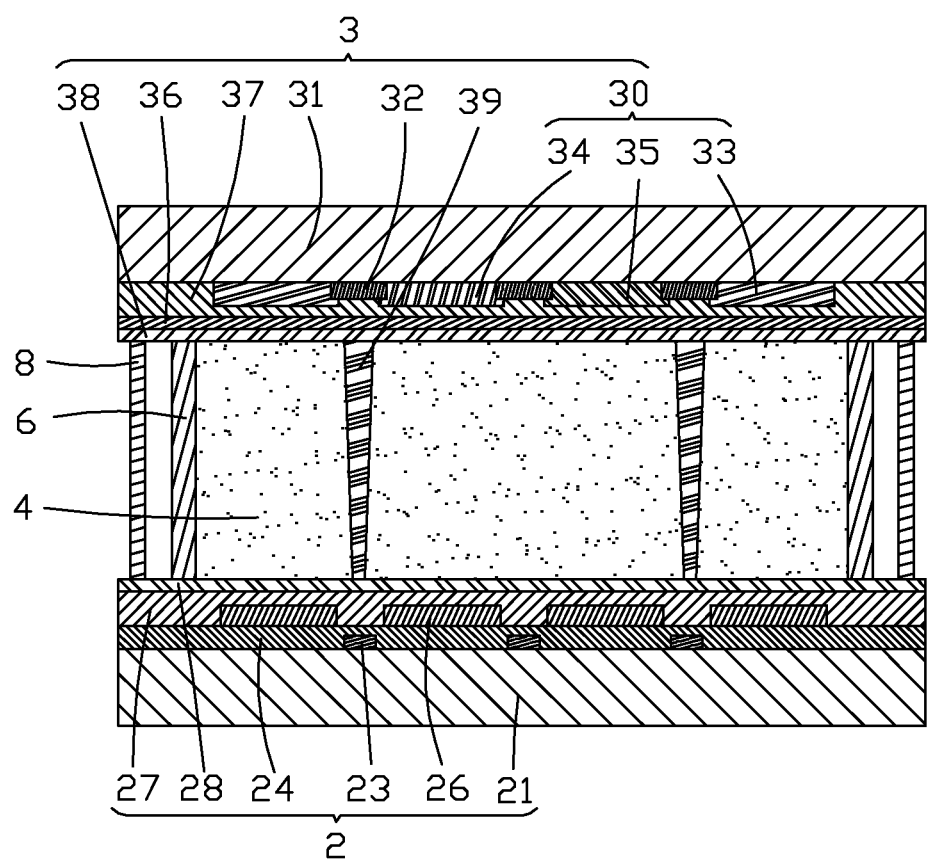
FIG. 2 is a schematic view showing the structure of a color liquid crystal display panel according to the present invention.
Figure 3:
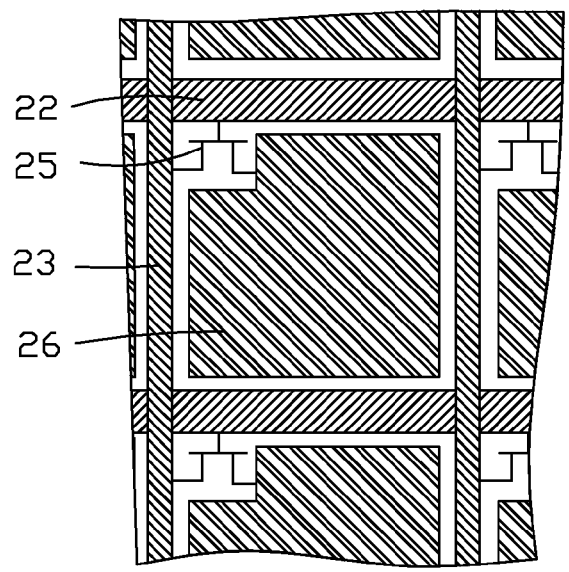
FIG. 3 shows a diagram of an equivalent circuit of a first substrate of FIG. 2.
Figure 4:
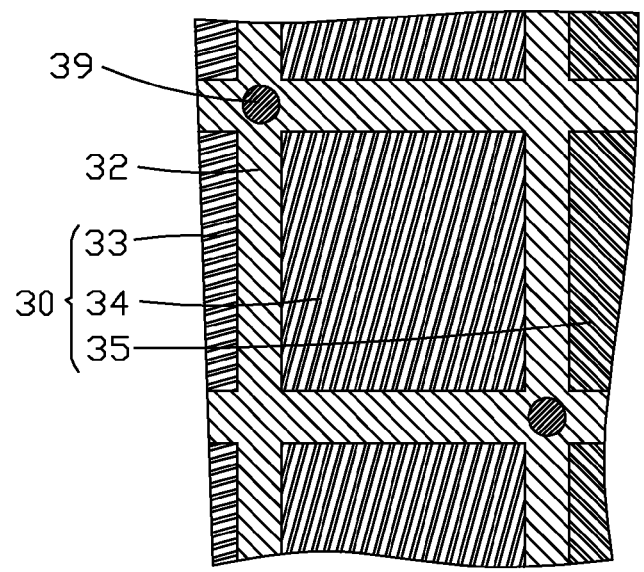
FIG. 4 is a top plan view of a second substrate of FIG. 2.

Referring to FIGS. 2-4, the present invention provides a color liquid crystal display panel, which comprises: a first substrate 2, a second substrate 3 laminated on the first substrate 2, and dye-doped liquid crystal layers 4 hermetically sealed between the first substrate 2 and the second substrate 3.

As shown in FIGS. 2 and 3, the first substrate 2 is a thin-film transistor array substrate. The first substrate 2 comprises a first transparent substrate 21, a plurality of gate lines 22 formed on the first transparent substrate 21, a plurality of data lines 23 formed on the first transparent substrate 21, an array of thin-film transistors 25 formed on the first transparent substrate 21, an insulation layer 24 formed on the array of thin-film transistors 25, the data lines 23, and the first transparent substrate 21, pixel electrodes 26 formed on the insulation layer 24, a first planarization layer 27 formed on the pixel electrodes 26 and the insulation layer 24, and a first alignment layer 28 formed on the first planarization layer 27.

The first transparent substrate 21 can be a glass substrate or a plastic substrate and is preferably a glass substrate in the instant embodiment.

The thin-film transistors each 25 comprises a gate terminal g, a source terminal s, and a drain terminal d. The gate terminals g are electrically connected to the gate lines 22. The source terminals s are electrically connected, through vias, to the data lines 23. The drain terminals d are electrically connected to the pixel electrodes 26. The pixel electrodes 26 are preferably made of indium tin oxides (ITO). The first alignment layer 28 is a horizontal alignment layer and the first alignment layer 28 realizes alignment by means of rubbing alignment or photo alignment. The gate lines 22 and the pixel electrodes 26 partially overlap each other to form storage capacitors $C_{st}$. The pixel electrodes 26, the first planarization layer 27, and the first alignment layer 28 are all formed by means of masking processes.

As shown in FIGS. 2 and 4, the second substrate 3 is a package substrate, the second substrate 3 comprises a second transparent substrate 31, a black matrix 32 formed on the second transparent substrate 31, a color filter 30 arranged on the second transparent substrate 31 at a location corresponding to the black matrix 32, a second planarization layer 37 formed on the second transparent substrate 31, the black matrix 32, and the color filter 30, a common electrode 36 formed on the second planarization layer 37, a second alignment layer 38 formed on the common electrodes 36, and a spacer layer 39 formed on the second alignment layer 38.

The second transparent substrate 31 can be a glass substrate or a plastic substrate and is preferably a glass substrate in the instant embodiment.

The black matrix 32 functions to shield light so as to make the sites where lights are not supposed to transmit black.

In the instant embodiment, the color filter 30 comprises a red filter 33, a green filter 34, and a blue filter 35 that are arranged to juxtapose each other. The black matrix 32 and the gate lines 22 and the data lines 23 collectively divide the color liquid crystal display panel into a plurality of pixels.

The common electrode 36 is preferably made of indium tin oxides. The second alignment layer 38 is a horizontal alignment layer. The second alignment layer 38 realizes alignment by means of rubbing alignment or photo alignment. The common electrode 26, the second planarization layer 37, and the second alignment layer 38 are all formed by means of masking processes.

The second alignment layer 38 has an alignment direction that defines an included angle with respect to an alignment direction of the first alignment layer 28. The included angle is greater than 0° and less than 180° and the included angle is preferably 90°. The second alignment layer 38 and the first alignment layer 28 makes the liquid crystal molecules 42 and the dichroic dye molecules 44 forming a nematic twisted arrangement at an initial condition and the twisting angle is greater than or equal to 90°. In other words, with no driving voltage applied to the first substrate 2 (the thin-film transistor array substrate) and the second substrate 3 (the package substrate), the liquid crystal molecules 42 and the dichroic dye molecules 44 both show a twisted arrangement of 90° or more than 90° and have aligning angles at multiple directions, as shown in FIG. 5 or 6.

The dye-doped liquid crystal layers 4 each comprise a liquid crystal material, a chiral dopant, and at least one dichroic dye. Each of the dichroic dyes absorbs a light of a predetermined wavelength range.

The liquid crystal material is a positive nematic liquid crystal material. In the instant embodiment, the dye-doped liquid crystal layers 4 preferably comprise three dichroic dyes. The three dichroic dyes respectively a dichroic dye that absorbs a light of red wavelength range, a dichroic dye that absorbs a light of green wavelength rang, and a dichroic dye that absorbs a light of blue wavelength range. The absorption spectra of the three dichroic dyes cover the entire spectrum of visible light. Correspondingly, the plurality of pixels comprises: a plurality of red pixels, a plurality of green pixels, and a plurality of blue pixels.

Figure 5:
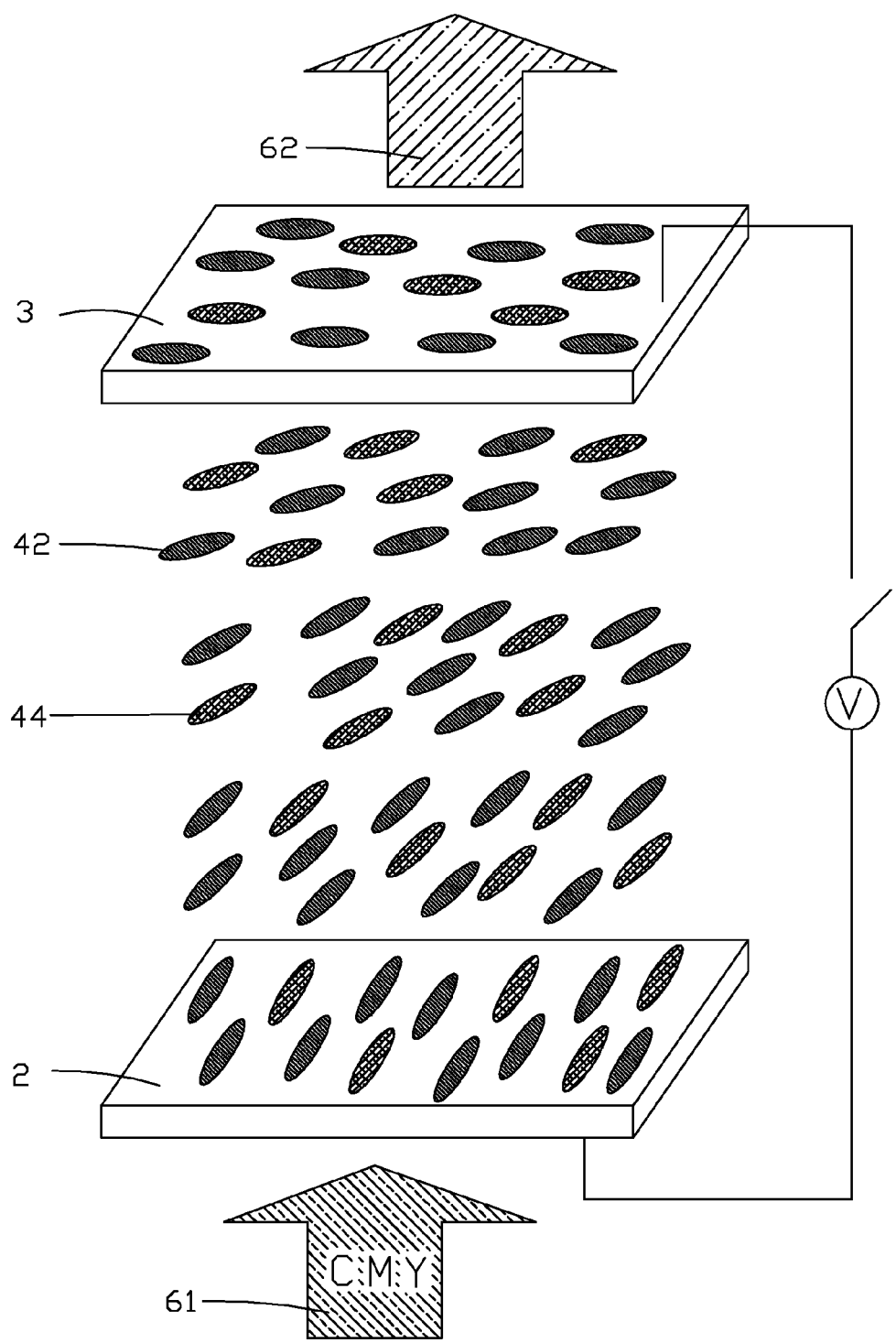
FIGS. 5 and 6 are schematic views demonstrating the principle of color displaying with the color liquid crystal display panel according to the present invention.
Figure 6:
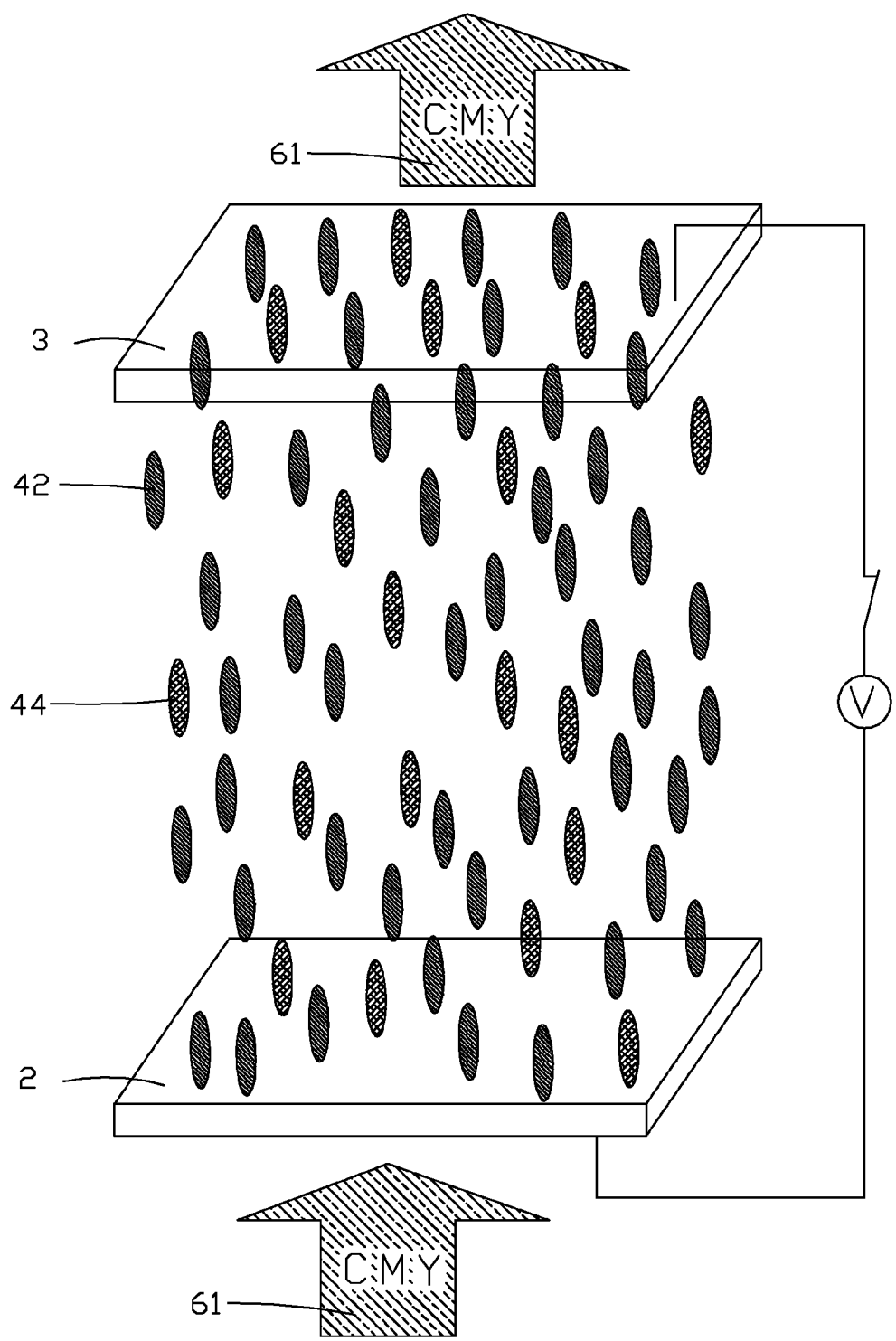

Referring to FIGS. 5-6, which demonstrate the principle of color displaying with the color liquid crystal display panel of the present invention, in the instant embodiment, the dye-doped liquid crystal layers comprise three dichroic dyes, which are respectively a dichroic dye that absorbs a light of red wavelength range, a dichroic dye that absorbs a light of green wavelength rang, and a dichroic dye that absorbs a light of blue wavelength range. The absorption spectra of the three dichroic dyes cover the entire spectrum of visible light. Except the absorption spectra are different, these different dichroic dyes are of similar molecular structures and properties.

The liquid crystal material comprises liquid crystal molecules 42 and the dichroic dyes comprise dichroic dye molecules 44. The dichroic dye molecules 44 has a molecular structure similar to a molecular structure of the liquid crystal molecules 42. The dichroic dye molecules 44 have a property of selective absorption of the visible light. When a visible light travels in a direction parallel to a major axis of the dichroic dye molecules 44, the dichroic dye molecules 44 generally show no absorbability of the visible light; and when a visible light travels in a direction perpendicular to the major axis of the dichroic dye molecules 44, the dichroic dye molecules 44 show strong absorbability of the visible light. Thus, through controlling the included angle between the dichroic dye molecules 44 and a light emitting from a backlight source (not shown), the extent that the light emitting from the backlight source can be absorbed by the dichroic dye molecules 44 can be adjusted so as to provide an effect of adjusting transmitting light intensity and achieve the purposes of displaying various grey levels.

As shown in FIG. 5, when no driving voltage is applied to the first substrate 2 and the second substrate 3, the first alignment layer 28 and the second alignment layer 38 that are of horizontal alignment make the liquid crystal molecules 42 and the dichroic dye molecules 44 forming a nematic twisted arrangement of an angle of 90° or more than 90° and show aligning angles at multiple directions. Under this condition, the dichroic dye molecules 44 show absorbability of a light 61 that gets vertically incident to a surface of the first substrate 2 and the second substrate 3 and has the greatest absorption extent. Light that is not absorbed is allowed to pass through the color filter 30 to generate a predetermined color light 62 so as to achieve color displaying of the liquid crystal display panel.

As shown in FIG. 6, when a driving voltage is applied to the first substrate 2 and the second substrate 3, under the action of an electric field, the liquid crystal molecules 42 and the dichroic dye molecules 44 start to rotate and the rotation angle thereof can be adjusted by controlling the level of the driving voltage applied. When the driving voltage applied to the first substrate 2 and the second substrate 3 reaches a predetermined level, the liquid crystal molecules 42 and the dichroic dye molecules 44 become aligned in a direction substantially perpendicular to a surface of the first substrate 2 or the second substrate 3. Under this condition, since the liquid crystal molecules 42 generally do not absorb visible light and since the dichroic dye molecules 44 generally do not absorb the light 61 emitting from the backlight source due to the major axis of the dichroic dye molecules 44 being substantially parallel to the traveling direction of the light emitting from the backlight source, when the driving voltage applied to the first substrate 2 and the second substrate 3 reach a predetermined level, mostly of the light 61 emitting from the backlight source is allowed to transmit through the liquid crystal display panel, thereby the entire liquid crystal display panel showing a bright state.

Figure 7:
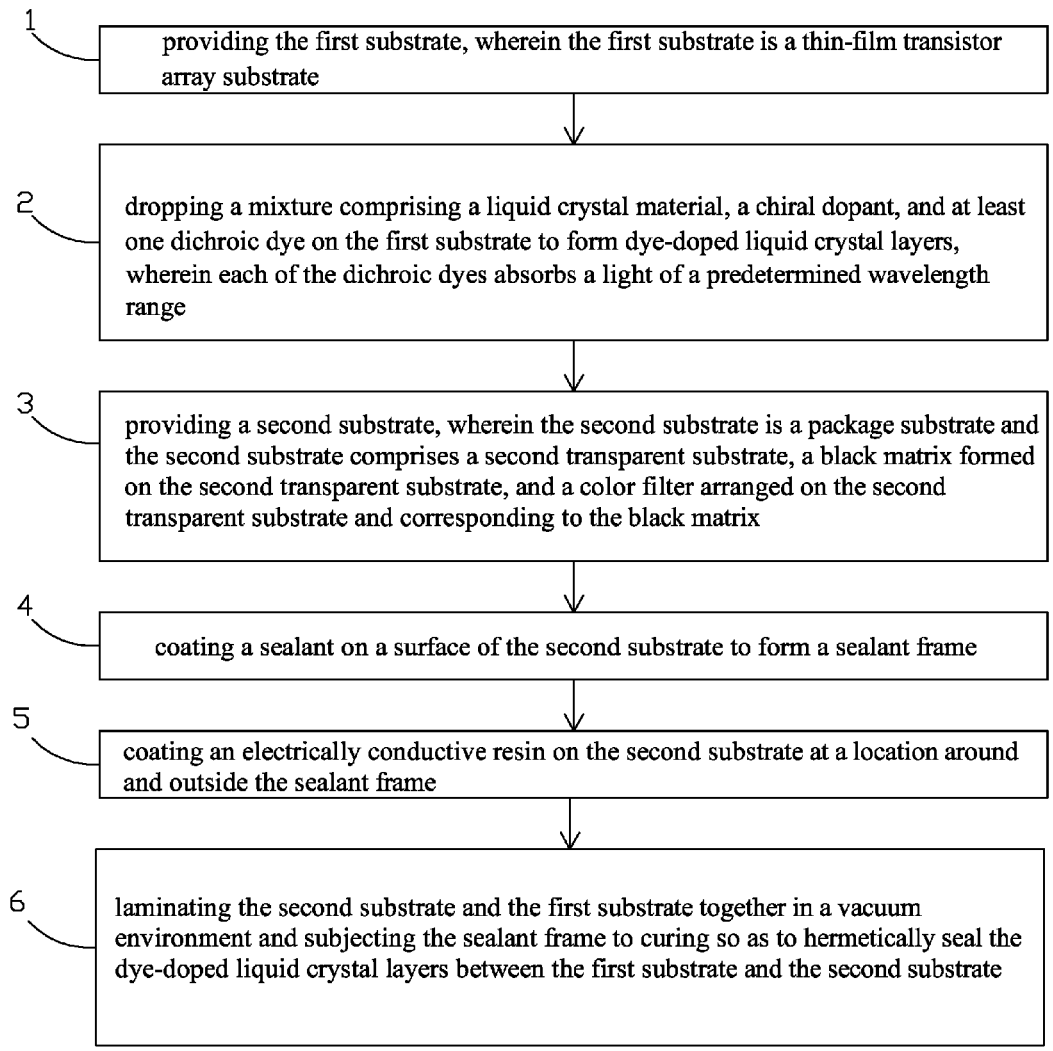
FIG. 7 is a flow chart illustrating a manufacturing method of a color liquid crystal display panel according to the present invention.

Referring to FIG. 7, with additional reference to FIGS. 2-4, the present invention also provides a manufacturing method of a liquid crystal display panel, which comprises the following steps:

Step 1: providing the first substrate 2, wherein the first substrate 2 is a thin-film transistor array substrate.

The first substrate 2 comprises a first transparent substrate 21, a plurality of gate lines 22 formed on the first transparent substrate 21, a plurality of data lines 23 formed on the first transparent substrate 21, an array of thin-film transistors 25 formed on the first transparent substrate 21, an insulation layer 24 formed on the array of thin-film transistors 25, the data lines 23, and the first transparent substrate 21, pixel electrodes 26 formed on the insulation layer 24, a first planarization layer 27 formed on the pixel electrodes 26 and the insulation layer 24, and a first alignment layer 28 formed on the first planarization layer 27.

The first transparent substrate 21 can be a glass substrate or a plastic substrate and is preferably a glass substrate in the instant embodiment.

The thin-film transistors each 25 comprises a gate terminal g, a source terminal s, and a drain terminal d. The gate terminals g are electrically connected to the gate lines 22. The source terminals s are electrically connected, through vias, to the data lines 23. The drain terminals d are electrically connected to the pixel electrodes 26. The pixel electrodes 26 are preferably made of indium tin oxides. The first alignment layer 28 is a horizontal alignment layer and the first alignment layer 28 realizes alignment by means of rubbing alignment or photo alignment. The gate lines 22 and the pixel electrodes 26 partially overlap each other to form storage capacitors. The pixel electrodes 26, the first planarization layer 27, and the first alignment layer 28 are all formed by means of masking processes.

Step 2: dropping a mixture comprising a liquid crystal material, a chiral dopant, and at least one dichroic dye on the first substrate 2 to form dye-doped liquid crystal layers 4, wherein each of the dichroic dyes absorbs a light of a predetermined wavelength range.

The dye-doped liquid crystal layers 4 each comprise a liquid crystal material, a chiral dopant, and at least one dichroic dye. Each of the dichroic dyes absorbs a light of a predetermined wavelength range.

The liquid crystal material is a positive nematic liquid crystal material. In the instant embodiment, the dye-doped liquid crystal layers 4 preferably comprise three dichroic dyes. The three dichroic dyes respectively a dichroic dye that absorbs a light of red wavelength range, a dichroic dye that absorbs a light of green wavelength rang, and a dichroic dye that absorbs a light of blue wavelength range. The absorption spectra of the three dichroic dyes cover the entire spectrum of visible light.

Step 3: providing a second substrate 3, wherein the second substrate 3 is a package substrate and the second substrate 3 comprises a second transparent substrate 31, a black matrix 32 formed on the second transparent substrate 31, and a color filter 30 arranged on the second transparent substrate 31 and corresponding to the black matrix 32.

The second substrate 3 further comprises a second planarization layer 37 formed on the black matrix 32 and the color filter 30, a common electrode 36 formed on the second planarization layer 37, a second alignment layer 38 formed on the common electrodes 36, and a spacer layer 39 formed on the second alignment layer 38.

The second transparent substrate 31 can be a glass substrate or a plastic substrate and is preferably a glass substrate in the instant embodiment.

The black matrix 32 functions to shield light so as to make the sites where lights are not supposed to transmit black.

In the instant embodiment, the color filter 30 comprises a red filter 33, a green filter 34, and a blue filter 35 that are arranged to juxtapose each other. The black matrix 32 and the gate lines 22 and the data lines 23 collectively divide the color liquid crystal display panel into a plurality of pixels. Correspondingly, in the instant embodiment, the plurality of pixels comprises: a plurality of red pixels, a plurality of green pixels, and a plurality of blue pixels.

The common electrode 36 is preferably made of indium tin oxides. The second alignment layer 38 is a horizontal alignment layer. The second alignment layer 38 realizes alignment by means of rubbing alignment or photo alignment. The common electrode 26, the second planarization layer 37, and the second alignment layer 38 are all formed by means of masking processes.

The second alignment layer 38 has an alignment direction that defines an included angle with respect to an alignment direction of the first alignment layer 28. The included angle is greater than 0° and less than 180° and the included angle is preferably 90°. The second alignment layer 38 and the first alignment layer 28 makes the liquid crystal molecules and the dichroic dye molecules forming a nematic twisted arrangement at an initial condition and the twisting angle is greater than or equal to 90°. In other words, with no driving voltage applied to the first substrate 2 (the thin-film transistor array substrate) and the second substrate 3 (the package substrate), the liquid crystal molecules and the dichroic dye molecules both show a twisted arrangement of 90° or more than 90° and have aligning angles at multiple directions.

Step 4: coating a sealant on a surface of the second substrate 3 to form a sealant frame 6.

The sealant frame 6 functions to hermetically seal the second substrate 3 and the first substrate 2.

Step 5: coating an electrically conductive resin 8 on the second substrate 3 at a location around and outside the sealant frame 6.

The electrically conductive resin 8 enables external electrons to flow into the dye-doped liquid crystal layers 4.

Step 6: laminating the second substrate 3 and the first substrate 2 together in a vacuum environment and subjecting the sealant frame to curing so as to hermetically seal the dye-doped liquid crystal layers 4 between the first substrate 2 and the second substrate 3. In the instant embodiment, UV curing or thermal curing is adopted to cure the sealant frame.

In summary, the present invention provides a color liquid crystal display panel and a manufacturing method thereof, wherein at least one dichroic dye is added in a liquid crystal material so as to use selective absorbability of the dichroic dye with respect to visible lights to adjust light intensity and also to achieve color displaying through collaboration of a color filter and the dichroic dye, whereby there is no need to include a conventionally used polarizer so as to reduce the manufacturing cost of the color liquid crystal display panel, also reduce the requirement for backlighting brightness, enhance light transmittal and optical efficiency, and thus lower down energy consumption of the operation of a color liquid crystal display.

Based on the description given above, those having ordinary skills of the art may easily contemplate various changes and modifications of the technical solution and technical ideas of the present invention and all these changes and modifications are considered within the protection scope of right for the present invention.

What is claimed is:

1. A color liquid crystal display panel, comprising: a first substrate, a second substrate laminated on the first substrate, and dye-doped liquid crystal layers hermetically sealed between the first substrate and the second substrate, the dye-doped liquid crystal layers each comprising a liquid crystal material, a chiral dopant, and three dichroic dyes, each of the dichroic dyes absorbing light of a predetermined wavelength range of one of red, green, and blue colors, the first substrate comprising a first transparent substrate, a plurality of gate lines formed on the first transparent substrate, and a plurality of data lines formed on the first transparent substrate, the second substrate comprising a second transparent substrate, a black matrix formed on the second transparent substrate, and a color filter that comprises red, green, and blue filters arranged on the second transparent substrate at a location corresponding to the black matrix, the black matrix and the gate lines and the data lines collectively dividing the color liquid crystal display panel into a plurality of pixels;

wherein the three dichroic dyes that respectively absorb red, green, and blue light are used in combination with the red, green, and blue filters to achieve color displaying; and wherein the three dichroic dyes that absorb light of red, green, and blue colors respectively are collectively mixed in the liquid crystal material of each of the dye-doped liquid crystal layers such that each of the dye-doped liquid crystal layers comprises the three dichroic dyes.

2. The color liquid crystal display panel as claimed in claim 1, wherein the liquid crystal material is a positive nematic liquid crystal material; and the plurality of pixels comprises: a plurality of red pixels, a plurality of green pixels, and a plurality of blue pixels;

the color liquid crystal display panel further comprising a sealant frame arranged on the second substrate and set on an edge of the second substrate and electrically conductive resin arranged on the second substrate and set outside the sealant frame.

3. The color liquid crystal display panel as claimed in claim 1, wherein the first substrate is a thin-film transistor array substrate and the first substrate further comprises an array of thin-film transistors formed on the first transparent substrate, an insulation layer formed on the array of thin-film transistors, the data lines, and the first transparent substrate, pixel electrodes formed on the insulation layer, a first planarization layer formed on the pixel electrodes and the insulation layer, and a first alignment layer formed on the first planarization layer; the second substrate is a package substrate and the second substrate further comprises a second planarization layer formed on the black matrix and the color filter, a common electrode formed on the second planarization layer, a second alignment layer formed on the common electrode, and a spacer layer formed on the second alignment layer.

4. The color liquid crystal display panel as claimed in claim 3, wherein the first transparent substrate and the second transparent substrate are both glass substrates, the pixel electrodes and the common electrodes being both made of indium tin oxides, the first alignment layer and the second alignment layer being both horizontal alignment layers, the first alignment layer and the second alignment layer realizing alignment by means of rubbing alignment or photo alignment, the first alignment layer having an alignment direction that defines an included angle with respect to an alignment direction of the second alignment layer, the included angle being greater than 0° and less than 180°.

5. The color liquid crystal display panel as claimed in claim 4, wherein the included angle defined between the alignment direction of the first alignment layer and the alignment direction of the second alignment layer is 90°.

6. A color liquid crystal display panel, comprising: a first substrate, a second substrate laminated on the first substrate, and dye-doped liquid crystal layers hermetically sealed between the first substrate and the second substrate, the dye-doped liquid crystal layers each comprising a liquid crystal material, a chiral dopant, and three dichroic dyes, each of the dichroic dyes absorbing light of a predetermined wavelength range of one of red, green, and blue colors, the first substrate comprising a first transparent substrate, a plurality of gate lines formed on the first transparent substrate, and a plurality of data lines formed on the first transparent substrate, the second substrate comprising a second transparent substrate, a black matrix formed on the second transparent substrate, and a color filter that comprises red, green, and blue filters arranged on the second transparent substrate at a location corresponding to the black matrix, the black matrix and the gate lines and the data lines collectively dividing the color liquid crystal display panel into a plurality of pixels;
- wherein the liquid crystal material is a positive nematic liquid crystal material; and the plurality of pixels comprises: a plurality of red pixels, a plurality of green pixels, and a plurality of blue pixels;
- the color liquid crystal display panel further comprising a sealant frame arranged on the second substrate and set on an edge of the second substrate and electrically conductive resin arranged on the second substrate and set outside the sealant frame;
- wherein the three dichroic dyes that respectively absorb red, green, and blue light are used in combination with the red, green, and blue filters to achieve color displaying; and
- wherein the three dichroic dyes that absorb light of red, green, and blue colors respectively are collectively mixed in the liquid crystal material of each of the dye-doped liquid crystal layers such that each of the dye-doped liquid crystal layers comprises the three dichroic dyes.

7. The color liquid crystal display panel as claimed in claim 6, wherein the first substrate is a thin-film transistor array substrate and the first substrate further comprises an array of thin-film transistors formed on the first transparent substrate, an insulation layer formed on the array of thin-film transistors, the data lines and the first transparent substrate, pixel electrodes formed on the insulation layer, a first planarization layer formed on the pixel electrodes and the insulation layer, and a first alignment layer formed on the first planarization layer; the second substrate is a package substrate and the second substrate further comprises a second planarization layer formed on the black matrix and the color filter, a common electrode formed on the second planarization layer, a second alignment layer formed on the common electrode, and a spacer layer formed on the second alignment layer.

8. The color liquid crystal display panel as claimed in claim 7, wherein the first transparent substrate and the second transparent substrate are both glass substrates, the pixel electrodes and the common electrodes being both made of indium tin oxides, the first alignment layer and the second alignment layer being both horizontal alignment layers, the first alignment layer and the second alignment layer realizing alignment by means of rubbing alignment or photo alignment, the first alignment layer having an alignment direction that defines an included angle with respect to an alignment direction of the second alignment layer, the included angle being greater than 0° and less than 180°.

9. The color liquid crystal display panel as claimed in claim 8, wherein the included angle defined between the alignment direction of the first alignment layer and the alignment direction of the second alignment layer is 90°.

10. A manufacturing method of a color liquid crystal display panel, comprising:
  (1) providing the first substrate, wherein the first substrate is a thin-film transistor array substrate;
  (2) dropping a mixture comprising a liquid crystal material, a chiral dopant, and three dichroic dyes respectively absorbing wavelength ranges of red, green, and red lights on the first substrate to form dye-doped liquid crystal layers;
  (3) providing a second substrate, wherein the second substrate is a package substrate and the second substrate comprises a second transparent substrate, a black matrix formed on the second transparent substrate, and a color filter that comprises red, green, and blue filters arranged on the second transparent substrate and corresponding to the black matrix;
  (4) coating a sealant on a surface of the second substrate to form a sealant frame;
  (5) coating an electrically conductive resin on the second substrate at a location around and outside the sealant frame; and
  (6) laminating the second substrate and the first substrate together in a vacuum environment and subjecting the sealant frame to curing so as to hermetically seal the dye-doped liquid crystal layers between the first substrate and the second substrate;
  wherein the three dichroic dyes that respectively absorb red, green, and blue light are used in combination with the red, green, and blue filters to achieve color displaying; and
  wherein the three dichroic dyes that absorb light of red, green, and blue colors respectively are collectively mixed in the liquid crystal material of each of the dye-doped liquid crystal layers such that each of the dye-doped liquid crystal layers comprises the three dichroic dyes.

11. The manufacturing method of the color liquid crystal display panel as claimed in claim 10, wherein the liquid crystal material is a positive nematic liquid crystal material; and in step (6), the sealant frame is subjected to UV curing or thermal curing.

12. The manufacturing method of the color liquid crystal display panel as claimed in claim 11, wherein the first substrate comprises a first transparent substrate, a plurality of gate lines formed on the first transparent substrate, a plurality of data lines formed on the first transparent substrate, an array of thin-film transistors formed on the first transparent substrate, an insulation layer formed on the array of thin-film transistors, the data lines, and the first transparent substrate, pixel electrodes formed on the insulation layer, a first planarization layer formed on the pixel electrodes and the insulation layer, and a first alignment layer formed on the first planarization layer; and the second substrate further comprises a second planarization layer formed on the black matrix and the color filter, a common electrode formed on the second planarization layer, a second alignment layer formed on the common electrode, and a spacer layer formed on the second alignment layer;

the black matrix and the gate lines and the data lines collectively dividing the color liquid crystal display panel into a plurality of pixels, the plurality of pixels comprising: a plurality of red pixels, a plurality of green pixels, and a plurality of blue pixels.

13. The manufacturing method of the color liquid crystal display panel as claimed in claim 12, wherein the first transparent substrate and the second transparent substrate are both glass substrates, the pixel electrodes and the common electrodes being both made of indium tin oxides, the first alignment layer and the second alignment layer being both horizontal alignment layers, the first alignment layer and the second alignment layer realizing alignment by means of rubbing alignment or photo alignment, the first alignment layer having an alignment direction that defines an included angle with respect to an alignment direction of the second alignment layer, the included angle being greater than 0° and less than 180°.

14. The manufacturing method of the color liquid crystal display panel as claimed in claim 13, wherein the included angle defined between the alignment direction of the first alignment layer and the alignment direction of the second alignment layer is 90°.

* * * * *